Figure 5:
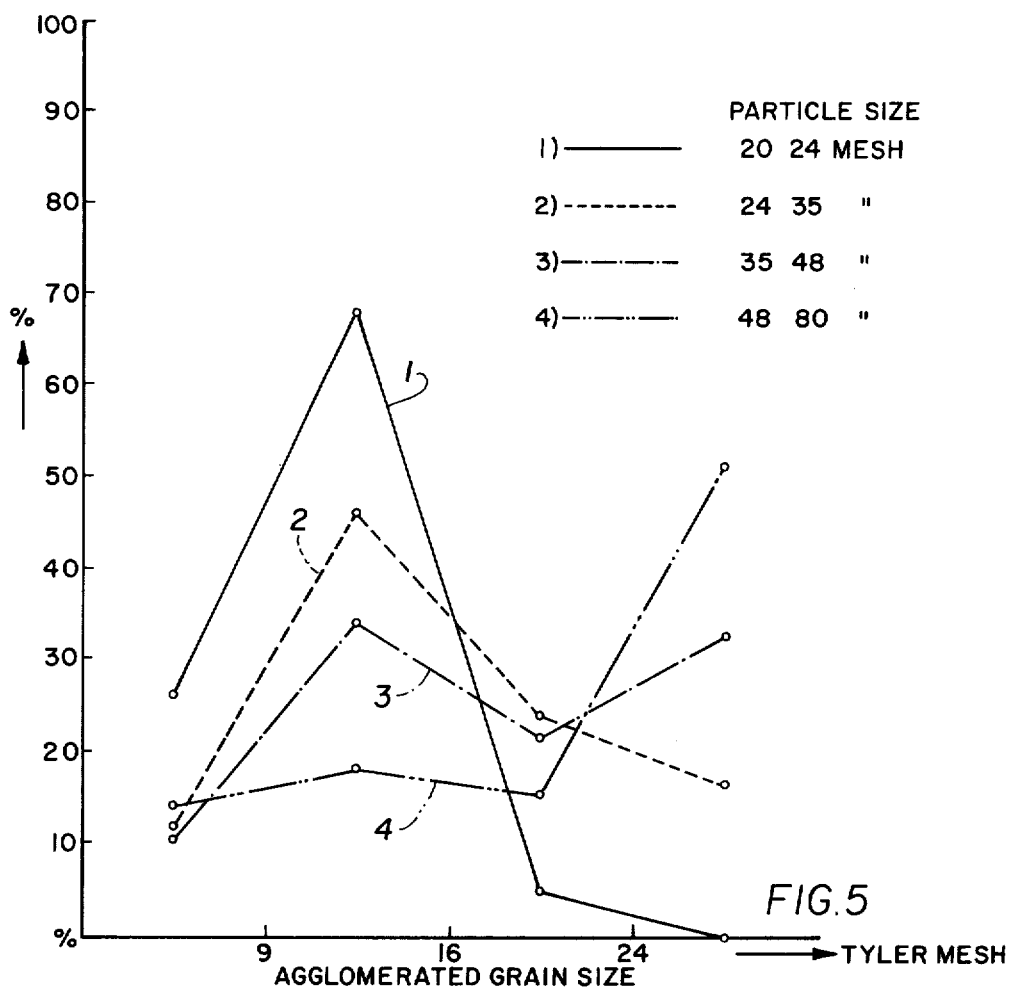

United States Patent [19]

Mori et al.

[11] 4,054,631
[45] Oct. 18, 1977

[54] METHOD FOR AGGLOMERATING HYGROSCOPIC DUST AND MOISTURE-CONTAINING COARSER PARTICLES

[75] Inventors: Toshikazu Mori, Yokohama; Mitsuru Wakui, Fujisawa, both of Japan

[73] Assignee: Nippon Electric Glass Company, Limited, Otsu, Japan

[21] Appl. No.: 668,685

[22] Filed: Mar. 19, 1976

Related U.S. Application Data

[63] Continuation-in-part of Ser. No. 498,368, Aug. 19, 1974, abandoned.

[30] Foreign Application Priority Data

Aug. 21, 1973   Japan ................................. 48-92950

[51] Int. Cl.² ............................................. B01J 2/12
[52] U.S. Cl. .............................. 264/117; 23/313 R; 23/313 AS; 264/122

[58] Field of Search ................. 264/117, 122; 23/313

[56] References Cited

U.S. PATENT DOCUMENTS

| | | | |
|---|---|---|---|
| 3,435,106 | 3/1969 | Hager | 264/117 |
| 3,894,882 | 7/1975 | Takewell et al. | 264/117 |

*Primary Examiner* — Robert F. White
*Assistant Examiner* — James R. Hall
*Attorney, Agent, or Firm* — Kurt Kelman

[57] ABSTRACT

Essentially dry hygroscopic dust recovered from the waste gas of a glass melting furnace is agglomerated with coarser particles of silica sand, calcium carbonate or dolomite having a moisture content of 5–20%, by weight, by intimately mixing the dust and coarser particles, and tumbling the mixture until particles of the dust are attached to the moisture-containing coarser particles.

5 Claims, 6 Drawing Figures

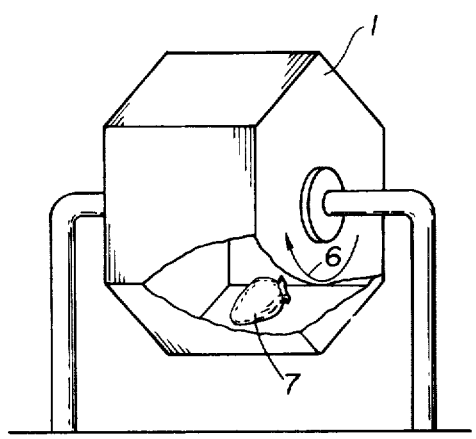
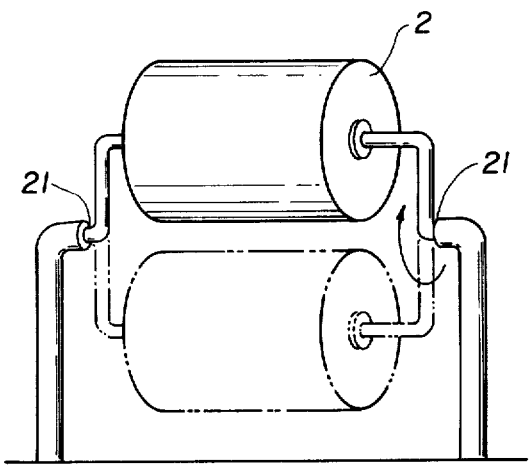
FIG.1    FIG.2
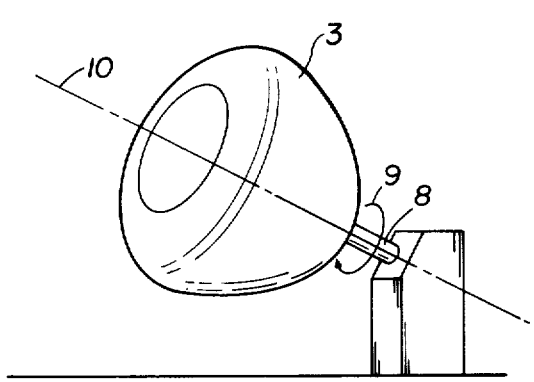
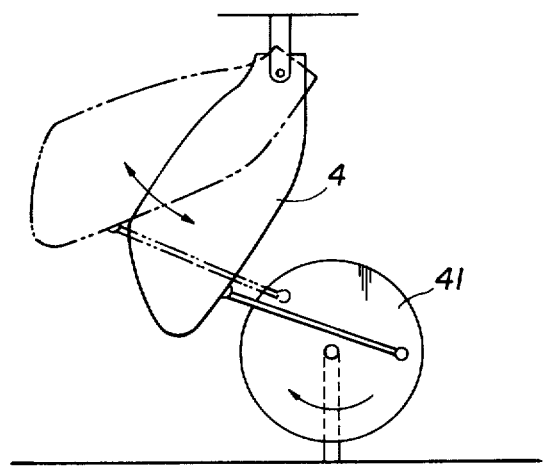
FIG.3    FIG.4

METHOD FOR AGGLOMERATING HYGROSCOPIC DUST AND MOISTURE-CONTAINING COARSER PARTICLES

This is a continuation-in-part of our U.S. patent application Ser. No. 498,368, filed Aug. 19, 1974, now abandoned.

The present invention relates to improvement in a method of agglomerating hygroscopic dust and a water-insoluble particulate material to form comparatively large-sized grains.

In glass making operations, the gas exhausted from the furnace includes chemical vapors and a hygroscopic dust which is removed rom the exhaust gas before the gas is vented to the atmosphere to prevent the dust from contaminating the ambient atmosphere. The fine particles in the waste gas collected in waste gas processing equipment, such as dust collectors, are mainly glass making materials. Therefore, it is desirable to recover this dust and recycle it for glass making. However, it is difficlt to handle this dust because it is readily scattered. To prevent this, it is desirable to agglomerate the dust nd to form larger sized particles having an increased apparent specific gravity.

It has been proposed to agglomerate fine powder or dust particles with the use of a kneader and an extrusion molding mixer. In such methods, water must be added to the dust. If the dust is hygroscopic and adhesive, the powder material will then readily adhere to the walls of the processing equipment and it will be difficult to remove it after drying and curing. This difficulty is encountered in connection with dust recovered from the waste gas of a glass meling furnace such dust is, generally, hygroscopic and adhesive.

It is the primary object of this invention to provide an improved method of agglomerating hygroscopic dust recovered from the waste gas of a glass melting furnace in order to recycle the dust to a supply of glass making materials in a glass making operation.

This and other objects are accomplished in accordance with the invention by first intimately mixing the hygroscopic dust, which is a fine powder of relatively small particle size, with coarser particles of silica sand, calcium carbonate or dolomite, only the coarser particles containing sufficient moisture to bond the hygroscopic dust to the coarser particles which have a moisture content between 5% and 20%, by weight, and then tumbling the mixture until particles of the hygroscopic dust are attached to outer surfaces of the moisture containing coarser particles to form agglomerated particles having the dust particles adhered to the coarser particles.

Known granulators or mixers may be used to tumble the mixture of essentially dry hygroscopic dust and wet water-insoluble coarser particles, that is, the mixture may be placed into a moving container, such as a rotary drum, and tumbled by the movement of the container.

To prevent moist particles from adhering to the inner surface of the moving container, the mixture is preferably inserted into a bag and the bag is then placed into the moving container to effect tumbling. Alternatively, the inner surface of the container may be coated with a mold release agent.

Figure 6:
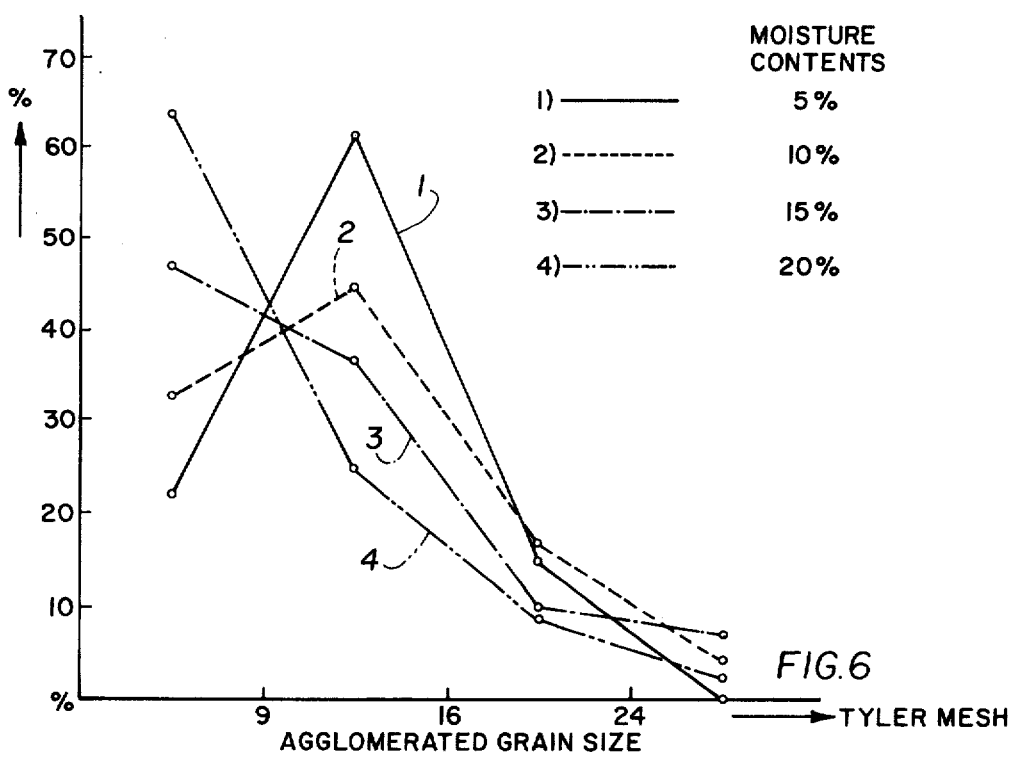

The above and other objects, advantages and features of the present invention will become more apparent from the followng detailed description of certain now preferred embodiments thereof, taken in conjunction with the accompanying drawing wherein FIGS. 1 to 4 show schematic views of different moving containers for tumbling the mixture according to this invention; and FIGS. 5 and 6 are graphs showing distribution curves of the particle size of particles agglomerated according to the invention.

Referring now to the drawing, an intimate mixture of essentailly dry hygroscopic dust of small particles size recovered from the waste gas of a glass melting furnace and of coarser particles of a water-insoluble material selected from the group consisting of silica sand, calcium carbonate and dolomite is placed in a moving container for tumbling, the particulate water-insoluble material having a moisture content of 5-20%, by weight.

In the embodiment of FIG. 1, the moving container is rotary drum 1 of hexagonal cross section and the intimate particle mixture is placed into bag 7 in the drum. Upon rotation of the drum in the direction of arrow 6 at a comparatively low speed, such as 60 to 100 r.p.m., the mixture in he bag will be tumbled so that the wet coarser particles will be intermixed uniformly with the dry dust particles, causing the dust particles to adhere to the outer surfaces of the coarser wet particles. Agglomerated particles will thus be obtained.

The bag may be made of polyvinyl resin film and its use will prevent the particles from adhering to the inner surface of the drum. The bag will be moved up and down in the rotating drum while varying its orientation at random, thus causing thorough tumbling of the particle mixture in the bag and uniform agglomeration. The resultant agglomerated particles each include a water-insoluble core to which hygroscopic dust adheres.

Another type of tumbler is shown in FIG. 2. Drum 2 of cylindrical cross section is mounted on crank shaft 21 so as to revolve and thus tumble a particle mixture placed into the interior of the drum.

Rotary drum 3 of FIG. 3 is mounted for rotation on rotary shaft 8 for rotation about diagonal axis 10.

The tumbler of FIG. 4 is a pivotally suspended container 4 which is mounted for pivotal movement about a horizontally extending axis, the container being linked to rotary eccentric 41 for swinging the container about its pivoting axis and thus to tumble a particle mixture in the container.

The following specific examples refer to the agglomeration of dust collected from the waste gas of a glass melting furnace in a dust collector in a glass making plant. The dust had the following composition, by weight: 38% $B_2O_3$, 20% $Na_2O$, 17% $K_2O$, 24% $(SO_3)_2$ and the balance other dry solids, giving a total dry solids content of more than 99% All percentages in the following examples are by weight.

EXAMPLE 1

One hundred grams of the dust and 100 g of wet silica sand having a moisture content of 5% were inserted in a polyvinyl resin bag 7, size 240 mm × 170 mm, and the bag was sealed and tumbled in rotary drum 1 for one minute at 100 r.p.m. The experiment was repeated with silica sand of different particle sizes, i.e. 20–24 mesh, 24–35 mesh, 35–48 mesh and 48–80 mesh, on the Tyler scale.

With each of the four sizes of silica sand, grains of larger size were formed after tumbling. Each grain was an agglomerate in which dust particles were attached to the outer surface of a particle of silica sand. The grain size distribution of the agglomerates is shown in the graph of FIG. 5 in which reference numerals 1, 2, 3 and 4 indicate the four particle sizes listed above. As shown in FIG. 5, larger silica sand particles provide agglomerated grains of larger diameter.

EXAMPLE 2

The experiments of Example 1 were repeated with a silica sand particles size of 24–32 mesh but different moisture contents, i.e. 5%, 10%, 15% and 20%.

The grain size distribution of the resultant agglomerates is shown in the graph of FIG. 6 in which reference numerals 1, 2, 3 and 4 indicate the different moisture percentages listed above. As shown in FIG. 6, the higher the moisture content of the silica sand the larger the agglomerated grains.

EXAMPLE 3

The dust and wet silica sand having a particle size of 20–24 mesh was put into four polyvinyl resin bags, each bag containing silica sand of a different moisture content and different mixture ratios, as indicated in Table I hereinbelow:

Table I

|  | Bag 1 | Bag 2 | Bag 3 | Bag 4 |
|---|---|---|---|---|
| Moisture content of silica sand (%) | 5 | 10 | 15 | 20 |
| Ratio of wet silica sand to dust | 1–2 | 0.5–1 | 0.4–0.7 | 0.2–0.5 |
| Grain size of agglomerated grains | fine ⟵⟶ large | | | |

The mixtures were placed in bags 7 in rotary drum 1 and were tumbled for 2 minutes at 30 to 100 r.p.m.

Comparing the agglomerated grains formed in the respective bags, it was found that the size of the agglomerated grains increases in proportion with the moisture content of the silica sand.

Experiments were repeated with the above mixtures in the tumblers of FIGS. 2, 3 and 4. These experiments showed that more intensive vibration or tumbling produced finer and more uniform agglomerated grains. With the revolving drum 2 of FIG. 2, it was possible to obtain agglomerated grains without adhesion of he dust particles to the inner surface of the drum when the mixture was put directly into the drum without wrapping it in a bag. This is believed to be due to the intensive vibration produced by this type of mixer.

Furthermore, similar results were obtained when the above experiments were repeated with the use of calcium carbonate or dolomite particles instead of silica sand as the wet, water-insoluble coarse material in admixture with the dust.

What is claimed is:

1. A method of agglomerating hygroscopic dust and a water-insoluble material, comprising
   a. placing within a sealable bag hygroscopic dust recovered from waste gas of a glass melting furnace and water-insoluble particulates selected from the group consisting of silica sand, calcium carbonate and dolomite, said particulates being coarser particles than said dust and having a moisture content of 5–20% by weight, an amount to adhere said dust particles to said coarser particles in forming agglomerates,
   b. sealing said bag,
   c. placing said sealed bag within a movable container,
   d. moving said container to tumble said bag therein to intimately mix and cause said dust particles to adhere to the surfaces of said particulates and form agglomerates thereby, and
   e. terminating the movement of said container, removing said bag therefrom, and recovering said formed agglomerates from said bag.

2. The method of claim 1 wherein the particle size of the particulates is between 20 mesh and 80 mesh on the Tyler scale.

3. The method of claim 1 wherein the moving container is a rotary drum and is moved by rotating said drum.

4. The method of claim 3 wherein the rotary drum is of polygonal cross section.

5. The method of claim 4, wherein the cross section of the rotary drum is hexagonal.

* * * * *